US011223612B2

(12) United States Patent
Georges

(10) Patent No.: US 11,223,612 B2
(45) Date of Patent: Jan. 11, 2022

(54) END TO END SECURE IDENTIFICATION AND VERIFICATION OF USERS FOR ORGANIZATIONS ON MULTITENANT PLATFORM

(71) Applicant: Network Platform Technologies Limited, London (GB)

(72) Inventor: Nicolas Pierre-Alain Georges, London (GB)

(73) Assignee: Network Platform Technologies Limited, London (GB)

(*) Notice: Subject to any disclaimer, the term of this patent is extended or adjusted under 35 U.S.C. 154(b) by 571 days.

(21) Appl. No.: 16/155,759

(22) Filed: Oct. 9, 2018

(65) Prior Publication Data

US 2019/0124072 A1 Apr. 25, 2019

Related U.S. Application Data

(60) Provisional application No. 62/575,696, filed on Oct. 23, 2017.

(51) Int. Cl.
*H04L 29/06* (2006.01)

(52) U.S. Cl.
CPC ...... *H04L 63/0815* (2013.01); *H04L 63/0892* (2013.01); *H04L 63/20* (2013.01)

(58) Field of Classification Search
CPC ............ H04L 63/0876; H04L 63/0815; H04L 63/0892; H04L 63/20; H04L 63/0807; H04L 63/0894; H04L 9/3226; H04L 9/3213; G06F 21/41
See application file for complete search history.

(56) References Cited

U.S. PATENT DOCUMENTS

| | | | |
|---|---|---|---|
| 8,566,248 B1* | 10/2013 | Steele | G06Q 30/0201 705/60 |
| 9,237,145 B2* | 1/2016 | Sondhi | H04L 63/10 |
| 2006/0236382 A1* | 10/2006 | Hinton | G06F 21/41 726/8 |
| 2015/0046994 A1* | 2/2015 | Sinha | H04L 41/0806 726/7 |

\* cited by examiner

*Primary Examiner* — Paul E Callahan
(74) *Attorney, Agent, or Firm* — Eric Kelly

(57) ABSTRACT

Embodiments of the present invention teach use of a single-platform with its own authentication-process (i.e., its own "single-platform-authentication-process" or its own selection of secure single-platform-authentication-processes), but that may allow third party service provider companies (Organizations) that want to offer/provide service(s) on the single-platform, to still utilize their own authentication-processes, i.e., to still utilize the given Organization's own "organization-specific-authentication-process," at least once in the initial user onboarding process, and thereafter to rely upon the common authentication-processes of the single-platform; which then permits a multitude of services, including the possibility of diverse and different services to be deployed from the single-platform.

16 Claims, 4 Drawing Sheets

END TO END SECURE IDENTIFICATION AND VERIFICATION OF USERS FOR ORGANIZATIONS ON MULTITENANT PLATFORM

PRIORITY NOTICE

The present application claims priority under 35 U.S.C. § 119(e) to U.S. Provisional Patent Application Ser. No. 62/575,696 filed on Oct. 23, 2017, the disclosure of which is incorporated herein by reference in its entirety.

TECHNICAL FIELD OF THE INVENTION

The present invention relates in general to authentication, as in identification and verification of users, and their user-devices and more specifically to such authentication on a single-platform that may allow one or more organizations to offer various services on the single-platform.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Currently (circa 2017) most platforms (such as, but not limited to, 'Platform as a Service' or 'Software as a Service') are either the end-use company offering a given service or working on behalf of another service provider company. Typically these platforms utilize secure onboarding (authentication) of a given user and their devices (sometimes with multi-factor authentication like sms [text message] verification, etc.). Often such platforms may or may not be aware of some of authentication factors (also known as identity factors or authentication-information) before the given user signups/logins for the first time. For example, a bank might issue and provide some type of identifier to a new user and may send a verification code via sms/text messaging to a pre-verified sms number (e.g., phone number). For example, a less secure platform might ask for these factors (i.e., authentication factors, identity factors, and/or authentication-information) during the first signup session.

If the platform were to propose services on behalf of multiple, different, and diverse service provider companies to the same user, these platforms currently assume the burden of the user onboarding process (authentication process) via the platforms own onboarding process (authentication process), and do not facilitate the capability to these service provider companies to enforce their own onboarding processes, which may necessarily vary according to the given service provider companies' needs, industry, and/or regulatory requirements. For example, the authentication processes a bank must utilize (e.g., imposed by law) may differ from a media content service provider (e.g., streaming service). This often means the user is regularly subjected to a variety of different authentication processes, and of varying complexity, depending the various online services the given user is trying to access and/or utilize. This has also meant single-platforms trying to offer a variety of different and diverse online services (e.g., from third parties) have largely not been adopted, since the service provider companies with different authentication needs have not wanted to or could not sacrifice their own authentication needs to rely upon a common authentication process of the single platform provider.

There is a need in the art to provide a single-platform with its own authentication-process (i.e., its own "single-platform-authentication-process"), but that may allow third party service provider companies (Organizations) that want to offer/provide service(s) on the single-platform, but to still utilize their own authentication-processes, i.e., to still utilize an "organization-specific-authentication-process," at least once; and thereafter to rely upon the common authentication-process of the single-platform.

It is to these ends that the present invention has been developed.

Here is an example illustrating the prior art processes:

PRIOR ART EXAMPLE

John Doe (a User) wants to use his online banking platform provided by bank CapitalBank (an Organization). John Doe has met physically with his banker and after a visual identification and verification of John Doe's details (e.g., ID [identification card], proof of address, etc.), CapitalBank trusts the identity of John Doe and generates an initial CapitalBank account ID and stores (saves) the phone number of John Doe in CapitalBank's system (database). When later John Doe tries to login on the online platform of CapitalBank, John Doe is prompted to enter John Doe's initial CapitalBank account ID—which may have been provided to John Doe via an sms/text message with a code sent to the phone number trusted by CapitalBank. If this code is entered correctly, John Doe is logged in and now John Doe may be prompted to create or have generated future access credentials, such as username and password. Thereafter, each time John Doe wants to connect to his online banking platform with CapitalBank, John Doe will have to use the generated future access credentials (such as the username and the password).

John Doe wants to now use online banking with FortuneBank (another and different Organization). John Doe has signed up online with FortuneBank and after a thorough identification and verification process, e.g., a slow mail (i.e., snail mail or traditional physical mail) is sent to John Doe's personal address with both a FortuneBank account ID and a onetime password linked to John Doe's account. When later John tries to login on the online platform of FortuneBank for his first time, John Doe is prompted to enter his FortuneBank account ID and has to insert (input) the onetime password. Thereafter, each time John Doe tries to access the online platform of FortuneBank from a new computer, he will also be prompted to enter a code sent by sms/text message to his phone number that has been stored as trusted by FortuneBank.

John Doe is also an employee of TheCompany (yet another different Organization) that has provided John Doe with a corporate phone, an employee ID and a requirement to use a password that John Doe has to change regularly. John Doe wants to connect to TheCompany's online platform. John Doe has to use his employee ID and password, and each time he tries to connect, no matter from which computer, a sms/text message code is sent to his corporate phone.

Thus, presently, each different service provider company (Organization) has its own and different "organization-specific-authentication-processes" making use of a single platform to deploy services on difficult and non-efficient.

In contrast here is an example utilizing embodiments of the present invention:

CapitalBank, FortuneBank and TheCompany (three different Organizations) want to provide their own services that they decide to deploy on the Single-Platform. CapitalBank, FortuneBank and/or TheCompany insist on confirming the identity of a given user with their own authentication-process (i.e., with their own "organization-specific-authentication-process" which may differ and vary by Organizations) at least once, relying afterwards on the Single-Platform's own authentication-process (i.e., "single-platform-authentication-process") in order to confirm that if a user is authenticated by the Single-Platform's "single-platform-authentication-process", it will be equivalent to using their own given "organization-specific-authentication-process."

John Doe wants to use/access service(s) offered by CapitalBank on the Single-Platform. John Doe is not yet a user of the Single-Platform, so CapitalBank onboards (authenticates) John Doe with secret details (i.e., authentication factors, identity factors, and/or authentication-information) that CapitalBank knows, e.g., his CapitalBank account ID and his personal phone number. CapitalBank sends also a link to John Doe by email with a special code, as CapitalBank also trusts John's email. John Doe follows the link to sign up with the Single-Platform by using at least one of several choices of secure authentication (i.e., "single-platform-authentication-process") that the Single-Platform offers. John Doe picks one such authentication-process to login on the Single-Platform. The authentication-process of the Single-Platform may generate and/or provide "single-platform-access-credentials" to John Doe for future access, now that John Doe's identity has been verified by at least one of single-platform-authentication-processes. A new computer (new User-Device) of John Doe may be trusted (authenticated) if John Doe follows a new User-Device authentication process provided by the Single-Platform. When John Doe now accesses the Single-Platform utilizing a trusted User-Device and the single-platform-access-credentials, the Single-Platform considers that John Doe is in fact John Doe. If John Doe has not already been authenticated via the CapitalBank's own "organization-specific-authentication-process," then John Doe may be prompted to finish that process initiated by CapitalBank. CapitalBank will not trust John Doe on the Single-Platform until John Doe's identity has been verified with CapitalBank's own onboarding process (i.e., by the CapitalBank's own "organization-specific-authentication-process")—at least once. Once John Doe's identity has been verified by CapitalBank's own "organization-specific-authentication-process," CapitalBank is now fully satisfied that John Doe on the Single-Platform is the John Doe that CapitalBank knows. John Doe will never have to use CapitalBank's own login process in the future. And when John Doe wants to use different devices or computers in order to connect to the Single-Platform in the future, John Doe will only have to follow the Single-Platform processes, and not CapitalBanks.

The same steps, methods, and/or processes may be applied to the other Organizations that wish to offer/provide services on the Single-Platform, such as, but not limited, to FortuneBank and TheCompany.

When John Doe now logs in on the Single-Platform, John Doe may be able to access a variety services provided by CapitalBank, FortuneBank, and/or TheCompany, as these service providers are satisfied that John Doe has established, at least once, his identity with their own specific onboarding (authentication) processes, and they trust that the Single-Platform login (access) process is reliable and secure, just (perhaps) different from their own.

Thus, embodiments of the present invention provide a missing link between service provider companies with diverse and often stringent onboarding (authentication) processes and the flexibility of the user self-onboarding on the underlying platform in order to guarantee the chain of 'identification and verification' of the given user and his/her user-devices.

Note the names used in the above example are for illustrative purposes only and are not intended to be real names

BRIEF SUMMARY OF THE INVENTION

To minimize the limitations in the prior art, and to minimize other limitations that will be apparent upon reading and understanding the present specification, embodiments of the present invention may describe a single-platform with its own authentication-process (i.e., its own "single-platform-authentication-process" or its own selection of secure single-platform-authentication-processes), but that may allow third party service provider companies (Organizations) that want to offer/provide service(s) on the single-platform, to still utilize their own authentication-processes, i.e., to still utilize the given Organization's own "organization-specific-authentication-process," at least once in the initial user onboarding process, and thereafter to rely upon the common authentication-processes of the single-platform; which then permits a multitude of services, including the possibility of diverse and different services to be deployed from the single-platform.

It is an objective of the present invention to provide a Single-Platform that encourages deployment of diverse services on the single-platform from different and potentially third party service providers, by allowing the given service provider to utilize, at least once, their own "organization-specific-authentication-process" to authenticate the identity of a given user and association of at least one user-device of the given user, before thereafter then relying upon "single-platform-authentication-processes" on the Single-Platform.

It is another objective of the present invention to provide the user with a simpler, more consistent, and/or more uniform manner to access a variety of online services, including potentially different services, from potentially different service providers, by providing deployment of such services on a Single-Platform wherein once an identity of the given user has been authenticated initially via the given service providers own "organization-specific-authentication-processes" future access for the given user may be via a common "single-platform-authentication-process" on the Single-Platform.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 3 may depict a block diagram of a generic computer wherein software implementing embodiments of the authentication-processes may run on.

Figure 1:
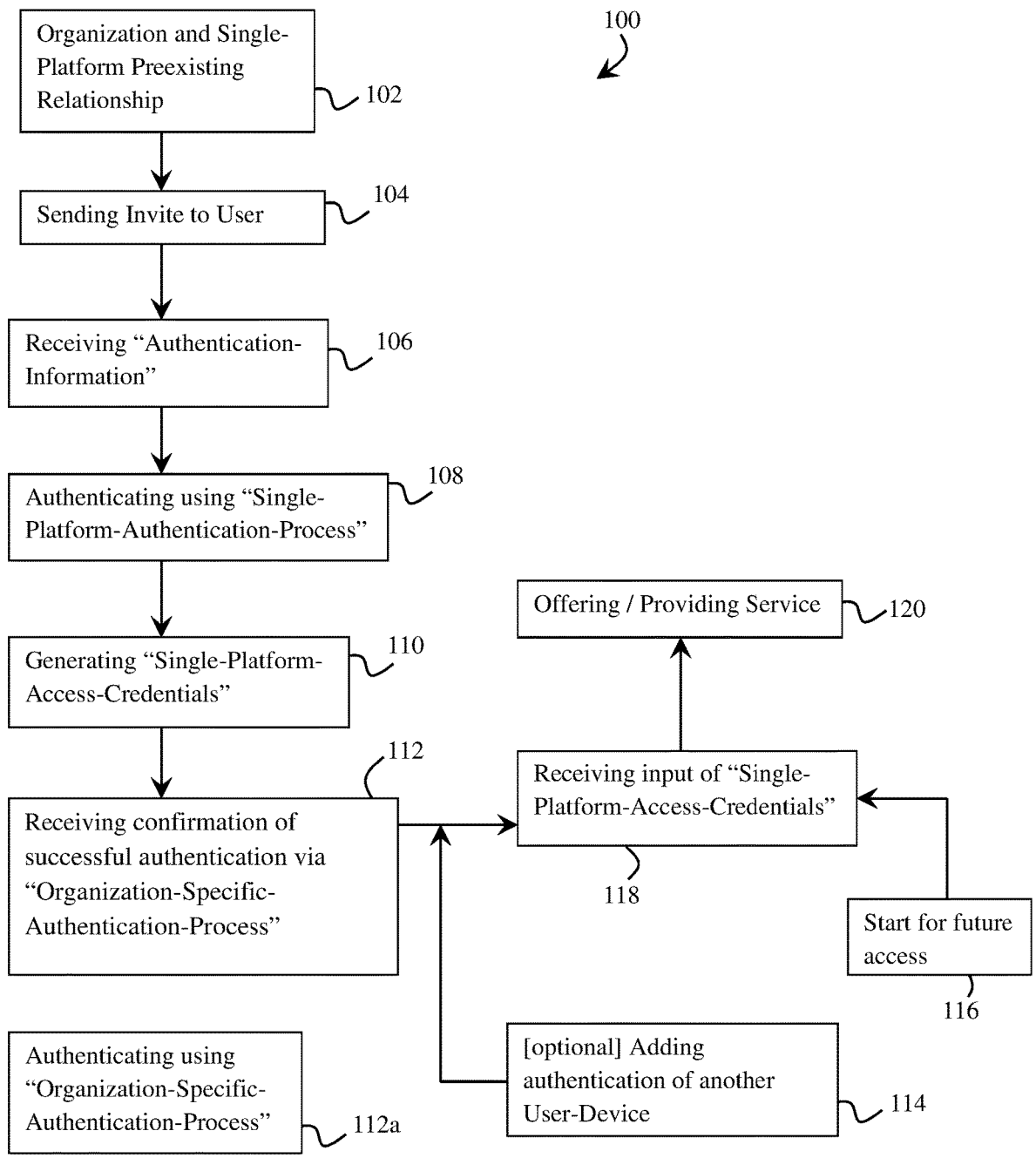
FIG. 1 may depict a process flow diagram for steps in an authentication-process of an embodiment of the present invention.

REFERENCE NUMERAL SCHEDULE 100 authentication-process 100
102 Organization and Single-Platform Preexisting Relationship 102
104 step of sending an invitation to at least one user 104
106 step of receiving authentication-information from the at least one user 106
108 step of authenticating using single-platform-authentication-process 108
110 step of generating single-platform-access-credentials 110
112 step of receiving confirmation of successful user identity authentication via organization-specific-authentication-process 112
112a step of authenticating using organization-specific-authentication-process 112a
114 step of adding authentication of another user-device 114
116 start point for future access 116
118 step of receiving input of single-platform-access-credentials 118
120 step of offering-at-least-one-service 120
202 User 202
204 User-Device 204
205 communication-pathway 205
206 Internet/WAN/LAN 206
208 Organization 208
210 Server-O 210
211 communication-pathway 211
212 Single-Platform 212
214 Server-SP 214
215 communication-pathway 215
300 Computer 300
302 Processor 302
304 Memory 304
306 Input/Output Means 306
400 authentication-process 400

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 may depict a process flow diagram for steps in an authentication-process 100 of an embodiment of the present invention. In some embodiments, authentication-process 100 may comprise steps: 104, 106, 108, and 110. In some embodiments, authentication-process 100 may comprise steps: 104, 106, 108, 110, and 112. In some embodiments, authentication-process 100 may comprise steps: 104, 106, 108, 110, 112, and 118. In some embodiments, authentication-process 100 may comprise steps: 104, 106, 108, 110, 112, 118, and 120.

Continuing discussing FIG. 1, in some embodiments, authentication-process 100 may begin with step 104. In some embodiments, step 104 may be a step of sending an invitation to at least one User 202. In some embodiments, this invitation may be sent from the Single-Platform 212 (e.g., from a Server-SP 214 that the Single-Platform 212 utilizes) and/or from at least one Organization 208 (e.g., from a Server-O 210 that the Organization 208 utilizes) selected from the one or more Organizations 208. In some embodiments, this invitation may be delivered via one or more of: email (electronic mail), text message, sms message, electronic messaging, telephone call, voicemail, mail, paper, note, card, and/or the like, directed to the given User 202 (or directed to a User-Device 204 associated with the given User 202). In some embodiments, this invite or a provided means for responding to the invite (e.g., link and/or online form), may request certain predetermined "authentication-information" of the given User 202.

Continuing discussing FIG. 1, in some embodiments, step 104 may then progress into step 106. In some embodiments, step 106 may be a step of receiving "authentication-information" from the at least one User 202. In some embodiments, the "authentication-information" may comprise two or more of the following associated with the at least one user: an email address, a telephone number, a text message address, a sms number, a password, a passcode, a secret number, a drivers license number, a social security number, a government issued ID number, a passport number, a copy of a drivers license, a copy of a social security card, a copy of government issued ID, a copy of a passport, an employee ID number, a copy of an employee ID, a physical or mailing address, a biometric identifier, challenge question and answer, and/or the like. In some embodiments, the received "authentication-information" may be received at/on the Single-Platform 212 (e.g., at or on a given Server-SP 214). In some embodiments, the authentication-information may also be known as "identity factors" or "authentication factors."

Continuing discussing FIG. 1, in some embodiments, step 106 may then progress into step 108. In some embodiments, step 108 may be a step of authenticating an identity of the at least one User 202 by utilizing the received authentication-information and by utilizing at least one "single-platform-authentication-process." In some embodiments, the "single-platform-authentication-process" may be an authentication process/method employed by/used by the Single-Platform 212. In some embodiments, step 108 may comprise presenting a predetermined number of different and/or secure "single-platform-authentication-processes" for the given User 202 to select. In some embodiments, a given "single-platform-authentication-process" of step 108 may be predetermined by a given Organization 208.

In some embodiments, step 108 of authenticating the identity of the at least one User 202 by utilizing the received authentication-information and by utilizing the selected or the predetermined single-platform-authentication-process, may further comprise associating at least one User-Device 204 with the authenticated identity of the at least one User 202; which may be important, since a given User 202 will most likely be accessing the Single-Platform 212 (e.g., Server-SP 214) via at least one User-Device 204. In some embodiments, during step 108, User 202 may be permitted to associate one or more User-Devices 204 with the Single-Platform 212. In some embodiments, the at least one User-Device 204 may comprise at least one "device-identifier." In some embodiments, the at least one "device-identifier" may be selected from one or more of: an IP address of the at least one User-Device 204, a MAC (media access control) address of the at least one User-Device 204, a model number of the at least one User-Device 204, a serial number of the at least one User-Device 204, and/or the like.

In some embodiments, the at least one User-Device 204 may be a computing device associated and/or used by the User 202. In some embodiments, the at least one User-Device 204 may be one or more computers. In some embodiments, the at least one User-Device 204 may be selected from one or more of: a smartphone, a tablet computing device, a laptop computer, a desktop computer, an all-in-one computer, a tower computer, a server, a smartwatch, a mobile computing device, and/or the like.

Continuing discussing FIG. 1, in some embodiments, step 108 may then progress into step 110. In some embodiments, successful authentication of the User's 202 identity, including association of the at least one User-Device 204, via step 108, may then allow authentication-process 100 to progress to step 110. In some embodiments, step 110 may be a step of generating "single-platform-access-credentials." For example, and without limiting the scope of the present invention, in some embodiments, the "single-platform-access-credentials" may be a username and a password; in other embodiments, other types of "single-platform-access-credentials" may be provided/generated. In some embodiments, "single-platform-access-credentials" may only be provided/generated in step 110 as a result of successful identity verification of the given User 202, including association of at least one User-Device 204 to that given User 202, of step 108.

Continuing discussing FIG. 1, in some embodiments, step 110 may then progress into step 112. In some embodiments, step 112 may be a step of receiving a confirmation that authentication of the identity of the at least one User 202—by an "organization-specific-authentication-process" of the given Organization 208—has completed successfully. In some embodiments, the "organization-specific-authentication-process" may be an authentication process/method employed by/used by a given Organization 208 selected from the one or more Organizations 208. A given Organization 208 may insist that the identity of a given User 202 and the at least one user-Device 204 be done via the Organization's 208 own "organization-specific-authentication-process" at least once before relying upon the Single-Platform's 212 "single-platform-authentication-process" of step 108 or before relying upon Single-Platform's 212 "single-platform-access-credentials." In some embodiments, the Organization's 208 own "organization-specific-authentication-process" may be operating outside of the scope of authentication-process 100. In some embodiments, authentication-process 100 may not include step 112; in such embodiments, step 110 of authentication-process may proceed to step 118. In some embodiments, in terms of authentication mechanics, the Organization's 208 own "organization-specific-authentication-process" may be the same or different from the Single-Platform's 212 "single-platform-authentication-process."

Figure 4:
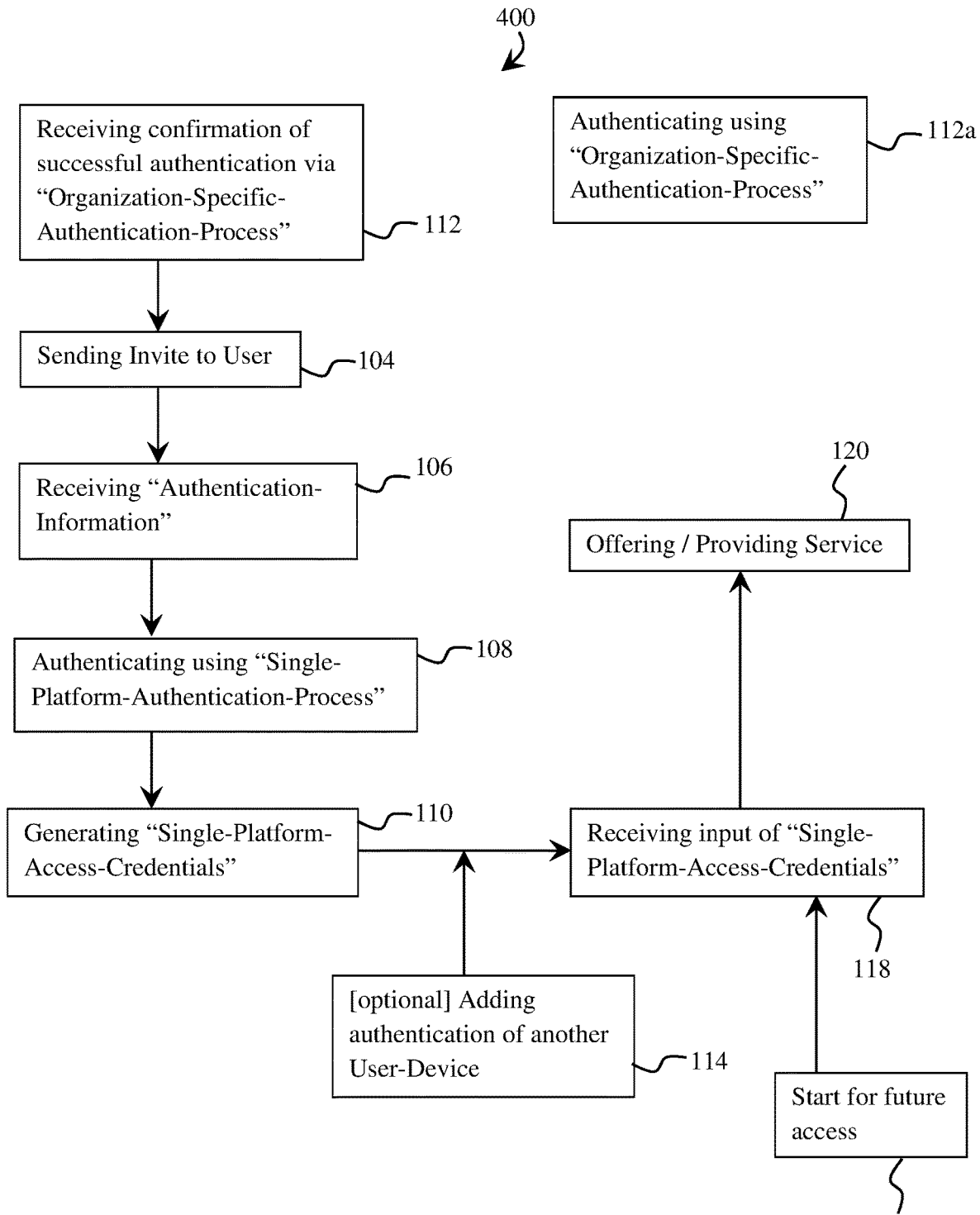
FIG. 4 may depict a process flow diagram for steps in an authentication-process of an embodiment of the present invention.

Note, in some embodiments, step 112 may proceed step 104, see e.g., authentication-process 400 shown in FIG. 4.

Note, in some embodiments, step 112 may be replaced by step 112a. In some embodiments, step 112a may be a step of authenticating the identity of the at least one User 202 by the "organization-specific-authentication-process." In some embodiments, authentication-process 100 may not include step 112a; in such embodiments, step 110 of authentication-process may proceed to step 118.

Continuing discussing FIG. 1, in some embodiments, an optional step of step 114 may proceed step 118. In some embodiments, step 114 may be a step of adding authentication of another User-Device 204 of the at least one User 202 utilizing the single-platform-authentication-process or utilizing a portion of the single-platform-authentication-process. Recall in step 108, one or more User-Devices 204 may have been associated with the authentication of the given at least one User 202; whereas, in step 114, a new or different User-Device 204 may now be associated with the authentication of the given at least one User 202.

Continuing discussing FIG. 1, in some embodiments, step 118 may be a step of receiving input of the "single-platform-access-credentials." In some embodiments, step 118 may follow step 112 or step 118 may follow step 110. In some embodiments, step 118 of receiving input of the "single-platform-access-credentials," may be received at Single-Platform 212 (e.g., at Server-SP 214). In some embodiments, the received "single-platform-access-credentials" may be received from the given User 202, e.g., from their authenticated (trusted) User-Device 204.

Continuing discussing FIG. 1, in some embodiments, step 118 may then progress into step 120. In some embodiments, step 120 may be a step of offering and/or providing at least one service to the given at least one User 202. In some embodiments, the at least one service is a service that at least one Organization 208 offers and/or provides. In some embodiments, the at least one Organization 208 may offer, provide, implement, and/or administer the given service through Single-Platform 212; and/or through the Organization's 208 own servers, such as Server-O 210; but wherein access to this service relies upon authentication-process 100.

In some embodiments, the one or more Organizations 208 may be selected from one or more of: a financial-institution (e.g., a bank, credit union, brokerage, etc.), a co-op, a government-body, an educational-institution (a school, college, university, trade-school, etc.), an employer, a provider of goods, a collective membership, a club, a group, a church, a charity, a not-for-profit, a fundraising campaign, a political party, a seminar provider, a webinar provider, a content provider, and/or the like.

In some embodiments, the service(s) may be selected from one or more of: an online transaction, online banking, viewing of bank account online, transfer of an amount from one account to another online, making a payment online, online purchasing, online selling, accessing online content, accessing online entertainment content, accessing online news content, accessing online education content, publishing content online, online test taking, applying for a loan online, applying for credit online, online scheduling of a service, online scheduling of a delivery, uploading files or information, submitting files or information, and/or the like. Services from different Organizations 208 may be very different or similar. Services from a given Organization 208 may be different or similar. Depending upon the nature of the services being offered/provided, different, less secure, or more secure authentication processes may be required.

In some embodiments, various boundary conditions or pre-conditions to authentication-process 100 may exist, such as pre-condition 102. In some embodiments, pre-condition 102 may entail that a given Organization 208 has a preexisting relationship with Single-Platform 212. See e.g., FIG. 1. For example, and without limiting the scope of the present invention, a given Organization 208 may want to deploy various services to its own Users 202 or to Users 202 of Single-Platform 212, wherein access to such services may rely upon the authentication-process 100 of Single-Platform 212; and in such scenarios that Organization 208 may establish a relationship with Single-Platform 212. Establishment of relationships between a given Organization 208 and Single-Platform 212, may include sharing of data related to a given User 202 (including that User's 202 User-Device(s) 204).

Continuing discussing FIG. 1, in some embodiments, Start 116 may indicate that once a given User 202, along with at least one User-Device 204 of that User 202 have been authenticated, such as via step 108 and/or via step 114, and that User 202 has the "single-platform-access-credentials" from step 110, then that User 202 may provide those "single-platform-access-credentials" via their authenticated (trusted) User-Device 204 to the Single-Platform 212 resulting in step 118, and then to access the various service(s) of step 120.

A benefit of authentication-process 100 may be that an authenticated (verified identity) User 202, along with an authenticated (trusted) User-Device 204, may access a plurality of diverse services offered from diverse Organizations 208 by utilizing only one authentication-process and/or by utilizing only "single-platform-access-credentials."

Figure 2:
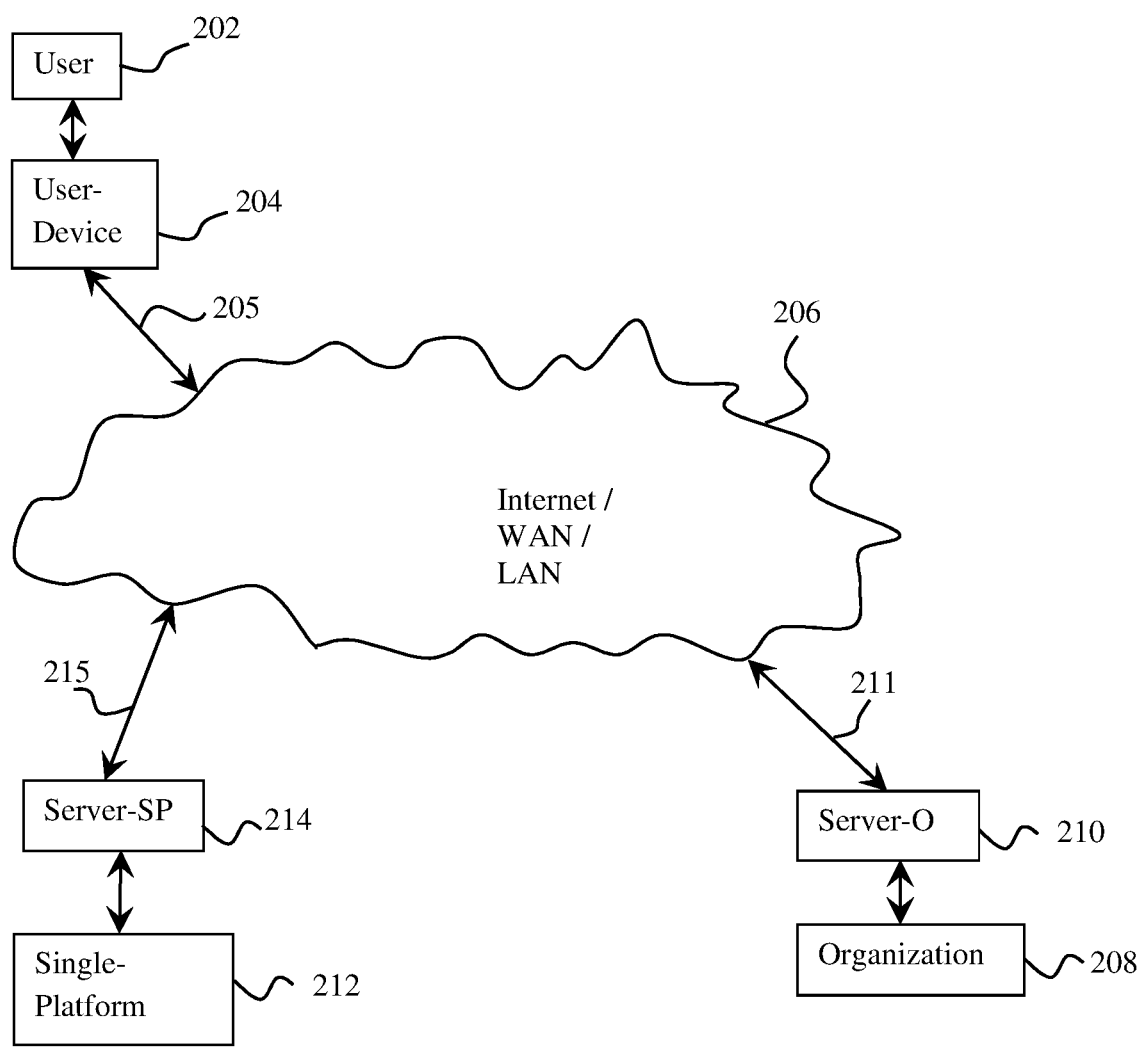
FIG. 2 may depict a block diagram showing various communication pathways that may be employed by embodiments of the authentication-processes.

FIG. 2 may depict a block diagram showing various communication pathways that may be employed by embodiments of the authentication-processes. In some embodiments, a given User 202 may access Internet/WAN/LAN 206 via use of their User-Device 204; wherein User-Device 204 may be in communication with Internet/WAN/LAN 206 via communication-pathway 205 (which may be wired, wireless, or combinations thereof). In Internet/WAN/LAN 206, "WAN" may refer to "wide area network" and "LAN" may refer to "local area network."

Continuing discussing FIG. 2, in some embodiments, a given Organization 208 may access Internet/WAN/LAN 206 via use of Server-O 210; wherein Server-O 210 may be in communication with Internet/WAN/LAN 206 via communication-pathway 211 (which may be wired, wireless, or combinations thereof). That is, Server-O 210 may be one or more servers of a given Organization 208. A server may be one or more computers, such as computers 300. In some embodiments, Server-O 210 may be a mobile-computing device, such as, not but not limited to, a smartphone, a tablet computing device, or a laptop. In some embodiments, agents (e.g., staff, employees, independent contractors, etc.) of Organization 208 may access Server-O 210 via one or more other computers, such as, but not limited to, a smartphone, a tablet computing device, a laptop computer, a desktop computer, an all-in-one computer, a tower computer, a server, a smartwatch, a mobile computing device, and/or the like.

Continuing discussing FIG. 2, in some embodiments, Single-Platform 212 may access Internet/WAN/LAN 206 via use of Server-SPO 214; wherein Server-SP 214 may be in communication with Internet/WAN/LAN 206 via communication-pathway 215 (which may be wired, wireless, or combinations thereof). That is, Server-SP 214 may be one or more servers of Single-Platform 212. A server may be one or more computers, such as computers 300.

Continuing discussing FIG. 2, in some embodiments, a given User 202 may access Single-Platform 212 via use of User-Device 204, through communication-pathway 205, through Internet/WAN/LAN 206, through communication-pathway 215, to Server-SP 214.

Continuing discussing FIG. 2, in some embodiments, a given Organization 208 may access Single-Platform 212 via use of Server-O 210, through communication-pathway 211, through Internet/WAN/LAN 206, through communication-pathway 215, to Server-SP 214.

Continuing discussing FIG. 2, in some embodiments, Single-Platform 212 may reach User 202 via use of Server-SP 214, through communication-pathway 215, through Internet/WAN/LAN 206, through communication-pathway 205, to User-Device 204.

Continuing discussing FIG. 2, in some embodiments, Single-Platform 212 may reach Organization 208 via use of Server-SP 214, through communication-pathway 215, through Internet/WAN/LAN 206, through communication-pathway 211, to Server-O 210.

Figure 3:
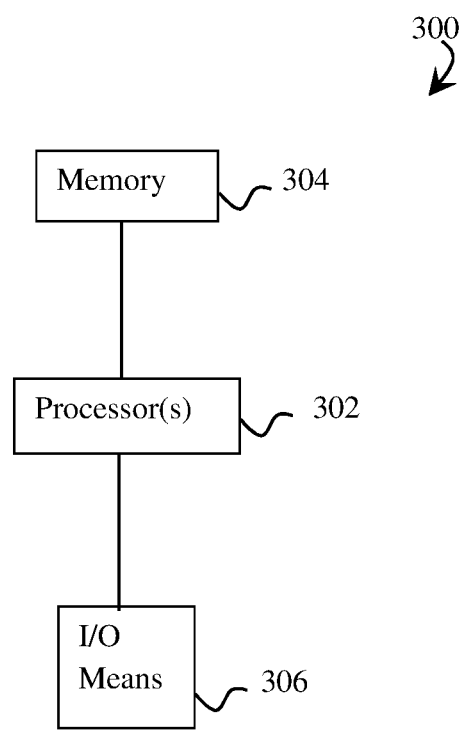

FIG. 3 may depict a block diagram of a generic computer 300 wherein software (e.g., program, code, scripts, etc.) implementing embodiments of the authentication-processes (e.g., 100 and/or 400) may run on. In some embodiments, computer 300 may show basic hardware elements of User-Device(s) 204, Server-O(s) 210, and Server-SP(s) 214.

In FIG. 3, Processor 303 may be one or more processors, including one or more central processors and/or one or more processors for graphics. In some embodiments, Processor 302 may be in communication with Memory 304. In some embodiments, Processor 302 may be in communication with Input/Output Means 306.

In some embodiments, Input/Output Means 306 may be selected from one or more of: screens, display screens, displays, monitors, touchscreens, readouts, keyboards, stylus, mouse, trackballs, touchpads, buttons, levers, slides, switches, microphones, speakers, buzzers, bells, whistles, lights, alarms, scanners, printers, and/or the like.

Continuing discussing FIG. 3, in some embodiments, Processor 302 may execute a computer program known as an operating system (e.g., a Microsoft Windows operating system, a Linux operation system, an Apple and/or Macintosh operating system, a mobile computing device operating system, any other suitable operating system, and/or combinations thereof) which may control the execution of other computer programs (e.g., application programs); and may provide for scheduling, input/output and other device control, accounting, compilation, storage assignment, data management, memory management, communication; and/or dataflow control. Collectively, Processor 302 and the operating system may define a computer platform for which the application programs and other computer program languages may be written in. In some embodiments, Processor 302 may also execute one or more computer programs to implement various functions and/or method of the present invention, such as authentication-process 100 (and/or authentication-process 400). These computer programs may be written in any type of computer program language, including, but not limited to, a procedural programming language, object-oriented programming language, macro language, and/or combinations thereof.

These computer programs may be stored in Memory 304. Memory 304 may store (hold) information on a volatile or non-volatile medium, and may be fixed and/or removable. Memory 304 may include a tangible computer readable and computer writable non-volatile recording medium, on which signals are stored that define a computer program or information to be used by the computer program. The recording medium may, for example, be disk memory, flash memory, and/or any other article(s) of manufacture usable to record and store information (in a non-transitory fashion). In some embodiments, Memory 304 may be at least one non-transitory computer readable storage medium. In some embodiments, in operation, Processor 302 may cause(s) data (such as, but not limited to, "authentication-information" and/or "single-platform-access-credentials") to be read from the nonvolatile recording medium into a volatile memory (e.g., a random access memory, or RAM) that may allow for more efficient (i.e., faster) access to the information by the Processor 302 as compared against the non-volatile recording medium. Such memory may be located in the Memory 304 and/or in Processor 302. See e.g., FIG. 3. The Processor 302 may manipulate(s) the data within integrated circuit memory and may then copy the data to the nonvolatile recording medium after processing may be completed. A variety of mechanisms are known for managing data movement between the nonvolatile recording medium and the integrated circuit memory element, and the invention is not limited to any mechanism, whether now known or later developed. The invention is also not limited to a particular processing unit or storage unit.

Note, each and every method and/or step discussed herein and as depicted in the figures may be implemented as non-transitory computer-readable medium including codes executable by a processor, such as Processor 302. That is, such non-transitory computer-readable medium may be the one or more Memory 304 storage units. That is, such a processor may be Processor 302; or alternatively, Processor 302 may comprise such a processor. In some embodiments, Processor 302 may comprise one or more processors.

FIG. 4 may depict a process flow diagram for steps in an authentication-process 400 of an embodiment of the present invention. In FIG. 4, step 112 may proceed step 104. In some embodiments, authentication-process 400 may comprise steps: 104, 106, 108, and 110. In some embodiments, authentication-process 400 may comprise steps: 104, 106, 108, 110, and 118. In some embodiments, authentication-process 400 may comprise steps: 104, 106, 108, 110, 118, and 120. In FIG. 4, the specifics and details of steps 112, 104, 106, 108, 110, 118, 120, 114, and 116 may be as described above in the FIG. 1 discussion, but step order in FIG. 4 may be different than that of the step order shown in FIG. 1. In some embodiments, authentication-process 400 may also include pre-condition 102.

Note the authentication-processes discussed herein may be implemented in one or more ways, such as, but not limited to: a computer-implemented method; at least one non-transitory computer-readable storage medium, in which computer-executable instructions are stored and are used for implementing the authentication-process(es); a computing apparatus (e.g., a computer and/or server) of a single-platform for implementing an authentication-process, comprising: at least one non-transitory computer readable storage medium; at least one processor coupled to the at least one non-transitory computer readable storage medium, wherein the at least one processor executes computer-executable instructions of the authentication-process steps. Further note that the computing processes discussed herein may be implemented in a distributed computing environment as well.

Authentication-processes, for single-platforms, wherein multiple and/or diverse services may be deployed on have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for at least one user-device accessing at least one service offered from at least one organization, on a computer-server of a single-platform, by the at least one user-device accessing the computer-server of the single-platform upon an identity of at least one user of the at least one user-device being authenticated using a single-platform-authentication-process after the identity of the at least one user has been authenticated by at least one organization-specific-authentication-process of the at least one organization, the method comprising steps of:

(a) receiving confirmation of successful authentication of the identity of the at least one user according to the at least one organization-specific-authentication-process of the at least one organization, wherein the step (a) occurs on the computer-server of the single-platform, wherein the at least one user and the at least one organization have a preexisting relationship that facilitates execution of the authentication of the identity of the at least one user according to the at least one organization-specific-authentication-process of the at least one organization;

(b) sending an invitation that requests authentication-information needed by the single-platform-authentication-process of the single-platform, to the at least one user, from the computer-server of the single-platform or from a computer-server of the at least one organization;

(c) receiving the authentication-information from the at least one user, at the computer-server of the single-platform;

(d) authenticating the identity of the at least one user by utilizing the authentication-information received in the step (c) from the at least one user and by utilizing the single-platform-authentication-process of the single-platform, wherein the step (d) occurs on the computer-server of the single-platform;

(e) generating single-platform-access-credentials that are configured to permit the at least one user to access the at least one service of the at least organization being offered through the computer-server of the single-platform; and (f) receiving input of the single-platform-access-credentials at the computer-server of the single-platform, from the at least one user-device, to provide the at least one user with access to at least one service; wherein the at least one user only accesses the at least one service through the computer-server of the single-platform wherein once the steps (a) through (e) have been executed at least once, subsequent access of the at least one service by the at least one user-device occurs by executing the step (f).

2. The method according to claim 1, wherein the invitation is delivered via one or more of: email (electronic mail), text message, sms message, electronic messaging, telephone call, voicemail, mail, paper, note, or card.

3. The method according to claim 1, wherein the authentication-information comprises two or more of the following associated with the at least one user: an email address, a telephone number, a text message address, a sms number, a password, a passcode, a secret number, a drivers license number, a social security number, a government issued ID number, a passport number, a copy of a drivers license, a copy of a social security card, a copy of government issued ID, a copy of a passport, an employee ID number, a copy of an employee ID, a physical or mailing address, a biometric identifier, or a challenge question and answer.

4. The method according to claim 1, wherein the step (d) of authenticating the identity of the at least one user by utilizing the authentication-information and by utilizing the single-platform-authentication-process further comprises associating the at least one user-device with the authenticated identity of the at least one user.

5. The method according to claim 4, wherein the at least one user-device comprises at least one device-identifier.

6. The method according to claim 5, wherein the at least one device-identifier is selected from one or more of: an IP address of the at least one user-device, a media access control address of the at least one user-device, a model number of the at least one user-device, or a serial number of the at least one user-device.

7. The method according to claim 1, wherein the authentication-process further comprises a step between the step (e) and the step (f) of adding authentication of another user-device of the at least one user utilizing the single-platform-authentication-process or utilizing a portion of the single-platform-authentication-process.

8. The method according to claim 1, wherein the at least one service is selected from one or more of: an online transaction, online banking, viewing of bank account online, transfer of an amount from one account to another online, making a payment online, online purchasing, online selling, accessing online content, accessing online entertainment content, accessing online news content, accessing online education content, publishing content online, online test taking, applying for a loan online, applying for credit online, online scheduling of a service, online scheduling of a delivery, uploading files or information, or submitting files or information.

9. The method according to claim 1, wherein the at least one user-device is one or more computers.

10. The method according to claim 1, wherein the at least one user-device is selected from one or more of: a smartphone, a tablet computing device, a laptop computer, a desktop computer, an all-in-one computer, a tower computer, a server, a smartwatch, or a mobile computing device.

11. The method according to claim 1, wherein the at least one organization is selected from one or more of: a financial-institution, a bank, a credit union, a co-op, a government-body, an educational-institution, a school, a college, a university, an employer, a provider of goods, a club, a collective membership organization, a group, a charity, a church, a not-for-profit organization, a fundraising campaign, a political party, a seminar provider, a webinar provider, or a content provider.

12. The method according to claim 1, wherein the single-platform and the at least one organization have a preexisting relationship.

13. The method according to claim 1, wherein the execution of the authentication of the identity of the at least one user according to the at least one organization-specific-authentication-process of the at least one organization occurs on the computer-server of the at least one organization.

14. The method according to claim 1, wherein prior to the step (d), the method further comprises a step of selecting the single-platform-authentication-process from a plurality of single-platform-authentication-processes.

15. The method according to claim 14, wherein the selection is done by the at least one organization.

16. The method according to claim 1, wherein the step (a) must occur at least once before the step (f).

* * * * *